(12) United States Patent
Zhang et al.

(10) Patent No.: US 11,951,881 B2
(45) Date of Patent: Apr. 9, 2024

(54) VEHICLE SEAT ASSEMBLY AND VEHICLE

(71) Applicant: Autoliv Development AB, Vargarda (SE)

(72) Inventors: Jin Zhang, Shanghai (CN); Kongfu Xie, Shanghai (CN)

(73) Assignee: Autoliv Development AB, Vargarda (SE)

( * ) Notice: Subject to any disclaimer, the term of this patent is extended or adjusted under 35 U.S.C. 154(b) by 421 days.

(21) Appl. No.: 17/310,135

(22) PCT Filed: Dec. 19, 2019

(86) PCT No.: PCT/CN2019/126592
§ 371 (c)(1),
(2) Date: Jul. 20, 2021

(87) PCT Pub. No.: WO2020/151419
PCT Pub. Date: Jul. 30, 2020

(65) Prior Publication Data
US 2022/0048412 A1    Feb. 17, 2022

(30) Foreign Application Priority Data

Jan. 25, 2019 (CN) .......................... 201910073399.9
Jan. 25, 2019 (CN) .......................... 201920130538.2

(51) Int. Cl.
*B60N 2/22* (2006.01)
*B60N 2/50* (2006.01)
(Continued)

(52) U.S. Cl.
CPC .............. *B60N 2/22* (2013.01); *B60N 2/501* (2013.01); *B60R 21/207* (2013.01);
(Continued)

(58) Field of Classification Search
CPC .......... B60N 2/22; B60N 2/501; B60N 2/203; B60R 21/207; B60R 21/233;
(Continued)

(56) References Cited

U.S. PATENT DOCUMENTS 7,484,795 B2 * 2/2009 Saint-Jalmes .......... B64D 11/06
297/130
9,150,178 B1 * 10/2015 Jayasuriya .............. B60R 22/26
(Continued)

FOREIGN PATENT DOCUMENTS

CN    107472184 A    12/2017
CN    108068745 A    5/2018
(Continued)

OTHER PUBLICATIONS

European Search Report received in corresponding EP application No. 19911585.8, dated Aug. 17, 2022.

*Primary Examiner* — Drew J Brown
(74) *Attorney, Agent, or Firm* — Harness, Dickey & Pierce, P.L.C.; Stephen T. Olson

(57) ABSTRACT

A vehicle seat assembly installed in a cabin of a vehicle having a vehicle seat and a side airbag device; the vehicle seat having a seat back and a seat base; the seat back connected to the seat base in a manner movable relative to the seat base in the front-rear direction of the vehicle. The side airbag device arranged on the vehicle seat including: a first side airbag and a second side airbag not in fluid communication with each other and configured to be unfolded between the vehicle seat and the side wall of the vehicle when in an inflated state; a controller for determining the orientation of the vehicle seat and detecting an impact signal to output a control signal; and a gas generator
(Continued)

for generating gas on the basis of the control signal of the controller to inflate the first side airbag or second side airbag.

13 Claims, 2 Drawing Sheets

(51) Int. Cl.
*B60R 21/207* (2006.01)
*B60R 21/233* (2006.01)
*B60R 21/261* (2011.01)

(52) U.S. Cl.
CPC .......... *B60R 21/233* (2013.01); *B60R 21/261* (2013.01); *B60R 2021/2612* (2013.01)

(58) Field of Classification Search
CPC .......... B60R 21/261; B60R 2021/2612; B60R 2021/23146; B60R 21/23138
See application file for complete search history.

(56) References Cited

U.S. PATENT DOCUMENTS

| | | | |
|---|---|---|---|
| 10,414,294 B2* | 9/2019 | Barbot | B60N 2/203 |
| 11,607,973 B2* | 3/2023 | Kanitz | B60N 2/933 |
| 11,708,013 B2* | 7/2023 | Ewehag | B60N 2/203 |
| | | | 297/95 |
| 11,731,740 B1* | 8/2023 | Hamilton, Sr. | B63B 29/06 |
| | | | 114/363 |
| 2005/0253433 A1 | 11/2005 | Brown et al. | |
| 2017/0267205 A1 | 9/2017 | Numazawa | |
| 2018/0126941 A1 | 5/2018 | Faruque et al. | |

FOREIGN PATENT DOCUMENTS

| | | |
|---|---|---|
| JP | 2006347322 A | 12/2006 |
| JP | 2017206047 A | 11/2017 |
| JP | 2018127180 A | 8/2018 |

* cited by examiner

VEHICLE SEAT ASSEMBLY AND VEHICLE

TECHNICAL FIELD

The present invention relates to automotive safety systems, and in particular, to vehicle seat assemblies, and vehicles including the vehicle seat assemblies.

BACKGROUND

Autonomous vehicles have attracted more and more attention. As the complexity and precision of the autonomous vehicle increase, the interaction required between a passenger and the autonomous vehicle decreases. Ultimately, the autonomous vehicle will likely not require the passenger to interact therewith except for certain specific actions (e.g., selecting a destination). In this situation, the passenger may divert his/her attention to tasks that are unrelated to driving. In one scenario, the passenger in the front seat may choose to communicate face-to-face with the passenger in the back seat; or may choose to ride in the same orientation of passenger in the vehicle seat as in a conventional vehicle to focus on scenes and road conditions in front of the vehicle. Accordingly, the vehicle seat in which the passenger in the front seat is located may be designed such that the seat backrest of the vehicle seat may be movable relative to the seat base of the vehicle seat so as to be located on the front side and the rear side of the vehicle seat in the front-rear direction of the vehicle, so that the passenger may choose to ride in the vehicle facing the front of the vehicle or facing the rear of the vehicle. However, airbags mounted in a vehicle seat and providing side protection for the passenger in the prior art are not suitable for application in the aforementioned vehicle seat because the airbags are designed only for the vehicle seat facing the front of the vehicle, and do not take into consideration the protection for the passenger riding in the vehicle seat facing the rear of the vehicle.

Accordingly, there is a need for a vehicle seat that can provide protection for a passenger regardless of whether the passenger is riding towards the front of the vehicle or towards the rear of the vehicle.

SUMMARY

The present invention provides a vehicle seat assembly capable of providing protection for a passenger regardless of whether the passenger is riding facing towards the front of the vehicle or towards the rear of the vehicle.

According to one aspect of the present invention, provided is a vehicle seat assembly mounted within a vehicle cabin of a vehicle, the vehicle seat assembly comprising,

- a vehicle seat comprising a seat backrest and a seat base, the seat backrest being connected to the seat base in such a manner as to be movable relative to the seat base in a front-rear direction of the vehicle such that the vehicle seat is capable of facing the front or the rear of the vehicle; and
- a side airbag device arranged on the vehicle seat and comprising,
- a first side airbag and a second side airbag that are not in fluid communication with each other and are configured to be deployed between the vehicle seat and a side wall of the vehicle when in an inflated and expanded state;
- a controller for determining the orientation of the vehicle seat and detecting an impact signal to output a control signal; and
- a gas generator for generating, based on the control signal of the controller, a gas to inflate the first side airbag or the second side airbag, such that the first side airbag is deployed if the vehicle seat is facing the front of the vehicle and the second side airbag is deployed if the vehicle seat is facing the rear of the vehicle.

According to an embodiment of the present invention, the gas generator comprises a first gas generator configured to inflate the first side airbag, and a second gas generator configured to inflate the second side airbag.

According to an embodiment of the present invention, the gas generator comprises a first vent path that is in fluid communication with the first side airbag for inflating the first side airbag and a second vent path that is in fluid communication with the second side airbag for inflating the second side airbag.

According to an embodiment of the present invention, the vehicle comprises a first row of seats near the front of the vehicle and a second row of seats near the rear of the vehicle, and the first row of seats comprises a driver seat on one side of the vehicle and the vehicle seat assembly on the other side of the vehicle.

According to an embodiment of the present invention, the first side airbag is designed to have a volume in the deployed state that is smaller than a volume of the second side airbag in the deployed state.

According to an embodiment of the present invention, the controller comprises a sensor disposed on the seat backrest and/or the seat base for detecting whether a passenger is seated in the vehicle seat and determining the orientation of the vehicle seat.

According to an embodiment of the present invention, the sensor comprises a weight sensor disposed on the seat backrest.

According to an embodiment of the present invention, the seat backrest comprises a pivot arm pivotably connected with the seat base about a pivot axis parallel to the floor of the vehicle.

According to an embodiment of the present invention, the vehicle seat assembly further comprises a locking device for locking a position of the seat backrest relative to the seat base.

According to another aspect of the present invention, further provided is a vehicle comprising at least one of the aforementioned vehicle seat assemblies.

In the technical solution of the present invention, one of the two side airbags is selectively inflated according to the orientation of the vehicle seat, such that the side airbag is deployed between a passenger seated in the vehicle seat and a side wall of the vehicle. Therefore, the vehicle seat assembly according to the present invention can provide protection for the passenger with high safety regardless of whether the passenger is riding facing towards the front of the vehicle or the rear of the vehicle.

According to another aspect of the present invention, further provided is a vehicle seat assembly mounted within a vehicle cabin of a vehicle, the vehicle seat assembly comprising:

- a vehicle seat comprising a seat backrest and a seat base, the seat backrest being connected to the seat base in such a manner as to be movable relative to the seat base in a front-rear direction of the vehicle such that the vehicle seat is capable of facing the front or the rear of the vehicle; and a side airbag device arranged on a side frame of a seat backrest frame of the vehicle seat and comprising,
a side airbag configured to be deployed between the vehicle seat and a side wall of the vehicle when in an inflated and expanded state, such that the side airbag is deployed between a passenger seated in the vehicle seat and a side wall of the vehicle regardless of whether the vehicle seat faces the front or the rear of the vehicle, so as to provide protection for the passenger.

According to an embodiment of the present invention, the side airbag comprises a first side airbag and a second side airbag, and the deployed first side airbag is positioned in front of the deployed second side airbag in the front-rear direction of the vehicle, such that if the vehicle seat faces the front of the vehicle, the deployed first side airbag provides protection for a passenger seated in the vehicle seat, and if the vehicle seat faces the rear of the vehicle, the deployed second side airbag provides protection for a passenger seated in the vehicle seat.

According to an embodiment of the present invention, the first side airbag and the second side airbag are in fluid communication with each other.

According to an embodiment of the present invention, the side airbag device further comprises a gas generator, the gas generator comprising a first gas generator configured to inflate the side airbag in the first side airbag and a second gas generator configured to inflate the side airbag in the second side airbag.

According to an embodiment of the present invention, the vehicle comprises a first row of seats near the front of the vehicle and a second row of seats near the rear of the vehicle, and the first row of seats comprises a driver seat on one side of the vehicle and the vehicle seat on the other side of the vehicle.

According to an embodiment of the present invention, the first side airbag is designed to have a volume in the deployed state that is smaller than a volume of the second side airbag in the deployed state.

According to an embodiment of the present invention, the seat backrest comprises a pivot arm pivotably connected with the seat base about a pivot axis parallel to the floor of the vehicle.

According to an embodiment of the present invention, the vehicle seat assembly further comprises a locking device for locking a position of the seat backrest relative to the seat base.

According to another aspect of the invention, provided is a vehicle comprising at least one of the aforementioned vehicle seat assemblies.

The vehicle seat assembly according to the present invention can provide protection for the passenger with high safety regardless of whether the passenger is riding facing towards the front of the vehicle or the rear of the vehicle.

DETAILED DESCRIPTION

Figure 1A:
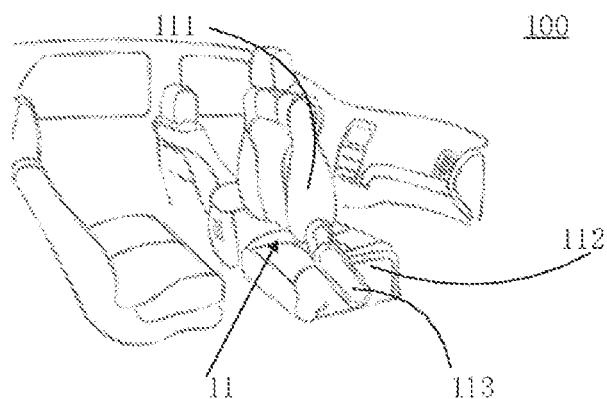
FIGS. 1(a) and 1(b) show schematic views of a vehicle seat assembly in a first state according to an embodiment of the present invention.

Detailed description of a vehicle seat assembly and a vehicle according to the present invention will be described below in connection with the accompanying drawings. The following detailed description and the accompanying drawings are used to illustratively explain the principles of the present invention. The present invention is not limited to the described preferred embodiments, and the protection scope of the present invention is defined by the claims.

In addition, terms for spatial relations (such as "upper," "lower," "left," "right," etc.) are used to describe a relative positional relationship between an element and another element shown in the accompanying drawings. Therefore, when used, the terms for spatial relations may be applied to directions different from those shown in the accompanying drawings. Obviously, although all of these terms for spatial relations refer to the directions shown in the accompanying drawings for ease of explanation, a person skilled in the art will appreciate that directions different from those shown in the drawings may be used.

Figure 1B:
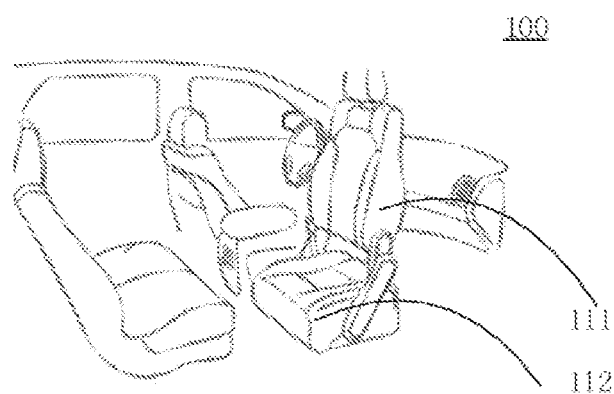

FIGS. 1(a) and 1(b) show schematic views of a vehicle seat assembly in a first state according to an embodiment of the present invention. The vehicle seat assembly according to an embodiment of the invention is described below in connection with FIGS. 1(a) and 1(b).

As shown in FIGS. 1(a) and 1(b), the vehicle seat assembly according to an embodiment of the present invention is mounted in a vehicle cabin of a vehicle 100, where the right side is the front of the vehicle and the left side is the rear of the vehicle. The vehicle 100 includes a first row of seats near the front of the vehicle and a second row of seats near the rear of the vehicle, and the first row of seats includes a driver seat on one side of the vehicle (i. e., the left side of the vehicle) and a vehicle seat assembly according to an embodiment of the present invention on the other side of the vehicle (i. e., the right side of the vehicle), those skilled in the art can understand that the arrangement of the vehicle seat assembly according to the present invention in a vehicle is not limited thereto, for example, the vehicle 100 may include less than two rows of seats or more than two rows of seats and the vehicle seat assembly according to the present invention may be arranged in any row, and/or the vehicle 100 may include at least two vehicle seat assemblies according to the present invention.

As shown in FIGS. 1(a) and 1(b), the vehicle seat assembly includes a vehicle seat 11 and a side airbag device 12 (shown in FIG. 2) arranged on the vehicle seat 11 (e.g., arranged on a side frame of a seat backrest frame of the vehicle seat 11), and, the vehicle seat 11 includes a seat backrest 111 and a seat base 112, the seat backrest 111 being connected to the seat base 112 in such a manner as to be movable relative to the seat base 112 in the front-rear direction of the vehicle, such that the vehicle seat 11 is capable of facing the front or rear of the vehicle. In an embodiment according to the invention, relative movement between the seat base 112 and the seat backrest 111 is achieved by a pivot arm 113, correspondingly the seat backrest 111 includes the pivot arm 113 pivotally connected with the seat base 113 about a pivot axis parallel to the floor of the vehicle. Optionally, the vehicle seat assembly may further include a locking device for locking a position of the seat backrest 111 relative to the seat base 112 to prevent undesired movement of the seat backrest 111 away from a desired position relative to the seat base 112; the locking device may, for example, be a device such as an electric motor for performing an automatic locking operation, but the vehicle seat assembly according to the present invention is not limited thereto, and the locking device may also be manual locking, or it may not include a locking device in some application scenarios.

Figure 2:
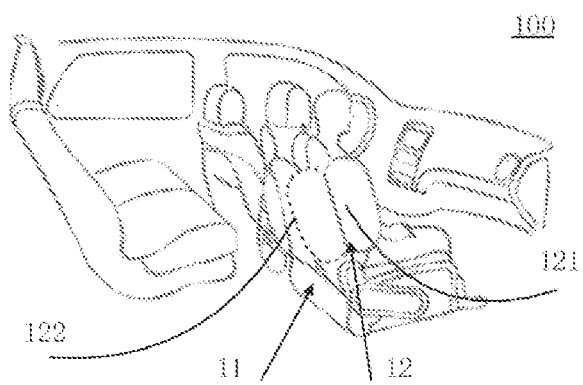
FIG. 2 shows a schematic view of the vehicle seat assembly in a second state according to an embodiment of the present invention.

In the situations shown in FIGS. 1(a) and 1(b), the vehicle seat assembly is in a first state and in the situation shown in FIG. 2, the vehicle seat assembly is in a second state. Herein, the vehicle seat assembly in the first state refers to a state in which the side airbag in the vehicle seat assembly is not deployed, and the vehicle seat assembly in the second state refers to a state in which the side airbag in the vehicle seat assembly is deployed. Therefore, FIGS. 1 (a) and 1 (b) mainly show the vehicle seat 11 in the vehicle seat assembly according to the embodiment of the present invention, and the side airbag is accommodated within the vehicle seat 11 and thus cannot be seen. A side airbag device in the vehicle seat assembly according to an embodiment of the present invention is described with reference to FIG. 2.

As shown in FIG. 2, the side airbag device 12 includes a first side airbag 121 and a second side airbag 122 that are not in fluid communication with each other, and are deployed between the vehicle seat 11 and a side wall (not shown) of the vehicle 100 when the first side airbag 121 or the second side airbag 122 is in an inflated and expanded state. It should be noted that although FIG. 2 shows a schematic view of the first side airbag 121 and the second side airbag 122 being deployed at the same time; however, this is merely to facilitate understanding of the working position of the side airbag device 12 of the vehicle seat assembly according to the present invention when being deployed. In practice, only one, but not both, of the first side airbag 121 and the second side airbag 122 will be inflated when the vehicle 100 is impacted. Referring to FIG. 2, it can be seen that the first side airbag 121 is designed to be deployed if the vehicle seat 11 faces the front of the vehicle, and the second side airbag 122 is designed to be deployed if the vehicle seat 11 faces the rear of the vehicle. Those skilled in the art can understand that the terms "first side airbag" and "second side airbag" are merely used for convenience of description but are not limited to the situation described in the above embodiments. For example, the first side airbag may be deployed if the vehicle seat 11 faces the rear of the vehicle, and the second side airbag may be deployed if the vehicle seat 11 faces the front of the vehicle. Preferably, considering the auxiliary protection effect of the B pillar, the first side airbag 121 is designed to have a volume in the deployed state that is smaller than the volume of the second side airbag 122 in the deployed state. Those skilled in the art can understand that this is merely an example, and the side airbag device in the vehicle seat assembly according to the present invention is not limited thereto. For example, the two side airbags may be designed to have the same volume in the deployed state. In order to occupy less space, the first side airbag 121 and the second side airbag 122 may first be folded before being accommodated in the vehicle seat 11. The folding may be, for example, simultaneously rolling up the side airbag from left and right edges to the middle thereof, or first rolling up a part of the side airbag from upper and lower edges to the middle thereof, and then rolling up from left and right edges to the middle thereof, and other airbag folding methods selected by those skilled in the art from the prior art can also be employed. The structure of the side airbag device 12 in the vehicle seat assembly according to the embodiment of the present invention will be described in more detail with reference to FIG. 3.

Figure 3:
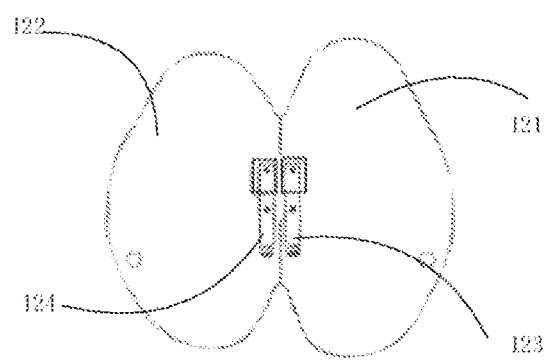
FIG. 3 is a schematic structural view of a side airbag device in a vehicle seat according to an embodiment of the present invention.

FIG. 3 is a schematic structural view of a side airbag device in a vehicle seat according to an embodiment of the present invention. The side airbag device in the vehicle seat according to the embodiment of the present invention will be further described in detail below with reference to FIG. 3.

First Embodiment

As shown in FIG. 3, in addition to the first side airbag 121 and the second side airbag 122 described above, the side airbag device 12 further includes a controller and a gas generator. The following describes a controller (not shown) and a gas generator (i. e., the first gas generator 123 and the second gas generator 124 in FIG. 3) of the side airbag device 12.

The controller is configured to determine the orientation of the vehicle seat 11 and to detect an impact signal to output a control signal. The determining the orientation of the vehicle seat 11 by the controller may be performed by a sensor, and accordingly the controller includes a sensor that may be disposed on the seat backrest and/or the seat base for detecting whether or not a passenger is seated in the vehicle seat and determining the orientation of the vehicle seat. For example, the sensor includes a weight sensor disposed on the seat backrest, and the weight sensor determines whether the vehicle seat faces the front or the rear by detecting a pressure signal from the front side or the rear side of the seat backrest. As another example, the sensor includes an optical sensor disposed on the seat backrest, and the optical sensor determines whether the vehicle seat faces the front or the rear by detecting an optical signal from the front or rear side of the seat backrest. Those skilled in the art can understand that in the side airbag device according to the present invention, the controller may employ any detection device capable of detecting the orientation of the vehicle seat and is not limited to the above sensors.

The gas generator is configured to generate, based on a control signal of the controller, a gas to inflate the first side airbag 121 or the second side airbag 122, such that the first side airbag 121 is deployed if the vehicle seat 11 faces the front of the vehicle and the second side airbag 122 is deployed if the vehicle seat faces the rear of the vehicle. Specifically, in the embodiment shown in FIG. 3, the gas generator includes a first gas generator 123 configured to inflate the first side airbag 121 and a second gas generator 124 configured to inflate the second side airbag 122. The vehicle seat assembly according to the present invention is not limited to the embodiments described above. For example, in the vehicle seat assembly according to the present invention, the number of gas generators is not limited to two. For example, the number of gas generators may be set to only one, and the gas generators may also be designed to include a first vent path that is in fluid communication with the first side airbag for inflating the first side airbag and a second vent path that is in fluid communication with the second side airbag for inflating the second side airbag.

The working process of the vehicle seat assembly according to the present invention is described below.

When the vehicle 100 is impacted, the controller of the side airbag device 12 detects an impact signal and determines the orientation of the vehicle seat 11 to output a control signal.

The gas generator generates, based on the control signal of the controller, a gas to inflate the first side airbag 121 or the second side airbag 122.

The first side airbag 121 is deployed if the vehicle seat 11 faces the front of the vehicle, and the second side airbag 122 is deployed if the vehicle seat faces the rear of the vehicle.

Therefore, in the vehicle seat assembly according to the present invention, one side airbag is configured to be deployed if the vehicle seat faces the front of the vehicle, the other side airbag is configured to be deployed if the vehicle seat faces the rear of the vehicle, and the two side airbags are not in fluid communication with each other. Also, the orientation of the vehicle seat can be determined before the side airbags are deployed, so as to determine which of the two side airbags needs to be inflated by the gas generator. Therefore, the vehicle seat assembly according to the present invention can provide protection for the passenger with high safety regardless of whether the passenger is riding facing towards the front of the vehicle or the rear of the vehicle.

Second Embodiment

As shown in FIG. 3, in addition to the first side airbag 121 and the second side airbag 122 described above, the side airbag device 12 further includes a gas generator. The gas generator of the side airbag device 12 is described below.

In the embodiment shown in FIG. 3, the gas generator includes a first gas generator 123 configured to inflate the side airbag in the first side airbag 121 and a second gas generator 124 configured to inflate the side airbag in the second side airbag 122. The vehicle seat assembly according to the present invention is not limited to the embodiments described above. For example, in the vehicle seat assembly according to the present invention, the number of gas generators is not limited to two, and the number of gas generators may be set to only one, or, in order to reduce the time of inflation and accelerate the inflation speed of the side airbag, the number of gas generators may be set to more than two. As another example, in the vehicle seat assembly according to the present invention, the number of side airbags is not limited to two, and those skilled in the art can set the number of side airbags according to the actual situation. Therefore, the side airbags can be designed as more than two side airbags in fluid communication with one another.

The working process of the vehicle seat assembly according to the present invention is described below. When the vehicle 100 is impacted, the gas generator generates, based on the received impact signal, a gas to inflate the first side airbag 121 and the second side airbag 122 in fluid communication with each other;

The first side airbag 121 and the second side airbag 122 are inflated to deploy, the deployed first side airbag 121 provides protection for a passenger seated in the vehicle seat 11 if the vehicle seat 11 faces the front of the vehicle, and the deployed second side airbag 122 provides protection for a passenger seated in the vehicle seat 11 if the vehicle seat 11 faces the rear of the vehicle.

Accordingly, in the vehicle seat assembly according to the present invention, the side airbag is deployed between the vehicle seat and a side wall of the vehicle when being inflated and expanded, such that the side airbag is deployed between a passenger seated in the vehicle seat and a side wall of the vehicle regardless of whether the vehicle seat faces the front or the rear of the vehicle, so as to provide protection for the passenger. Therefore, the vehicle seat assembly according to the present invention can provide protection for the passenger with high safety regardless of whether the passenger is riding facing towards the front of the vehicle or the rear of the vehicle.

According to another aspect of the present invention, further provided is a vehicle including one or more of the aforementioned vehicle seat assemblies to improve safety of the vehicle.

As described above, although the exemplary embodiments of the present invention have been described with reference to the accompanying drawings in the description, the present invention is not limited to the aforementioned specific embodiments, and the protection scope of the present invention should be defined by the claims and equivalent meanings thereof.

The invention claimed is:

1. A vehicle seat assembly for mounting within a vehicle cabin of a vehicle-comprising:
   a vehicle seat including a seat backrest and a seat base, the seat backrest connected to the seat base to be movable relative to the seat base in a front-rear direction of the vehicle such that the vehicle seat is capable of facing a front or a rear of the vehicle; and
   a side airbag device arranged on the vehicle seat and including:
   a first side airbag and a second side airbag that are not in fluid communication with each other and are configured to be deployed between the vehicle seat and a side wall of the vehicle- when in an inflated and expanded state;
   a controller for determining an orientation of the vehicle seat and detecting an impact signal to output a control signal; and
   a gas generator for generating, based on the control signal of the controller, a gas to inflate the first side airbag or the second side airbag, such that the first side airbag is deployed if the vehicle seat is facing the front of the vehicle and the second side airbag is deployed if the vehicle seat is facing the rear of the vehicle,
   wherein the first side airbag has a volume in a deployed state that is smaller than a volume of the second side airbag in the deployed state.

2. The vehicle seat assembly according to claim 1, wherein the gas generator comprises a first gas generator configured to inflate the first side airbag and a second gas generator configured to inflate the second side airbag.

3. The vehicle seat assembly according to claim 2 in combination with the vehicle, wherein the vehicle comprises a first row of seats near the front of the vehicle and a second row of seats near the rear of the vehicle, and the first row of seats comprises a driver seat on one side of the vehicle and the vehicle seat assembly on the other side of the vehicle.

4. The vehicle seat assembly according to claim 1, wherein the gas generator comprises a first vent path that is in fluid communication with the first side airbag for inflating the first side airbag and a second vent path that is in fluid communication with the second side airbag for inflating the second side airbag.

5. The vehicle seat assembly according to claim 1, wherein the controller comprises a sensor disposed on the seat backrest and/or the seat base for detecting whether a passenger is seated in the vehicle seat and determining the orientation of the vehicle seat.

6. The vehicle seat assembly according to claim 5, wherein the sensor comprises a weight sensor disposed on the seat backrest.

7. The vehicle seat assembly according to claim 6, wherein the seat backrest comprises a pivot arm pivotally connected with the seat base about a pivot axis parallel to a floor of the vehicle.

8. A vehicle seat assembly for mounting within a vehicle cabin of a vehicle—comprising,
   a vehicle seat including a seat backrest and a seat base, the seat backrest connected to the seat base so as to be movable relative to the seat base in a front-rear direction of the vehicle such that the vehicle seat is capable of facing a front or a rear of the vehicle; and
   a side airbag device arranged on a side frame of a seat backrest frame of the vehicle seat and including
   a side airbag configured to be deployed between the vehicle seat and a side wall of the vehicle when in an inflated and expanded state, such that the side airbag is deployed between a passenger seated in the vehicle seat and a side wall of the vehicle regardless of whether the vehicle seat faces the front or the rear of the vehicle, so as to provide protection for the passenger, wherein the side airbag includes a first side airbag and a second side airbag, and upon deployment the first side airbag is positioned in front of the second side airbag in the front-rear direction of the vehicle, such that if the vehicle seat faces the front of the vehicle, the deployed first side airbag provides protection for a passenger seated in the vehicle seat, and if the vehicle seat faces the rear of the vehicle, the deployed second side airbag provides protection for a passenger seated in the vehicle seat, and wherein the first side airbag and the second side airbag are in fluid communication with each other.

9. The vehicle seat assembly according to claim 8, wherein the side airbag device further comprises a gas generator, the gas generator comprising a first gas generator configured to inflate the side airbag in the first side airbag and a second gas generator configured to inflate the side airbag in the second side airbag.

10. The vehicle seat assembly according to claim 9, wherein the vehicle comprises a first row of seats near the front of the vehicle and a second row of seats near the rear of the vehicle, and the first row of seats comprises a driver seat on one side of the vehicle and the vehicle seat on the other side of the vehicle.

11. The vehicle seat assembly according to claim 10, wherein the first side airbag is designed to have a volume in a deployed state that is smaller than a volume of the second side airbag in the deployed state.

12. The vehicle seat assembly according to claim 11, wherein the seat backrest comprises a pivot arm pivotably connected with the seat base about a pivot axis parallel to a floor of the vehicle.

13. The vehicle seat assembly according to claim 12, wherein the vehicle seat assembly further comprises a locking device for locking a position of the seat backrest relative to the seat base.

\* \* \* \* \*